United States Patent
Maddalozzo, Jr. et al.

(10) Patent No.: US 6,178,460 B1
(45) Date of Patent: Jan. 23, 2001

(54) METHOD OF EFFICIENTLY RETRIEVING DATA ON A COMPUTER NETWORK BY MONITORING PERFORMANCE OF MIRRORED NETWORK LOCATIONS

(75) Inventors: John Maddalozzo, Jr.; Gerald Francis McBrearty; Johnny Meng Han Shieh, all of Austin, TX (US)

(73) Assignee: International Business Machines Corporation, Armonk, NY (US)

(*) Notice: Under 35 U.S.C. 154(b), the term of this patent shall be extended for 0 days.

(21) Appl. No.: 09/106,956

(22) Filed: Jun. 30, 1998

(51) Int. Cl.[7] .............................. G06F 11/30; G06F 13/00
(52) U.S. Cl. ..................... 709/239; 709/224; 709/219; 709/231
(58) Field of Search ................................. 709/224, 229, 709/219, 231, 239; 707/5, 10; 710/5

(56) References Cited

U.S. PATENT DOCUMENTS

| | | | |
|---|---|---|---|
| 5,832,197 | * 11/1998 | Houji | 709/239 |
| 5,892,754 | * 4/1999 | Kompella et al. | |
| 5,961,602 | * 10/1999 | Thompson et al. | 709/229 |
| 5,974,460 | * 10/1999 | Maddalozzo, Jr. et al. | 709/224 |
| 6,003,030 | * 12/1999 | Kenner et al. | 707/10 |
| 6,003,045 | * 12/1999 | Freitas et al. | 707/205 |
| 6,041,366 | * 3/2000 | Maddalozzo, Jr. et al. | 710/5 |
| 6,075,974 | * 6/2000 | Saints et al. | |
| 6,088,590 | * 7/2000 | Anderson et al. | |

OTHER PUBLICATIONS

Richardson et al., "Usage parameter control cell loss effects on MPEG video", IEEE International Conference on Communications, pp. 970–974, Jun. 1995.* de Veciana et al., "Resource management in wide–area ATM networks using effective bandwidths", IEEE Journal on Selected Areas in Communications, vol. 13 Issue 6, pp. 1081–1090, Jun. 1995.*

* cited by examiner

*Primary Examiner*—Mark H. Rinehart
*Assistant Examiner*—Almari Romero
(74) *Attorney, Agent, or Firm*—Volel Emile; Felsman, Bradley, Vaden, Gunter & Dillon, LLP

(57) ABSTRACT

An improved method for efficiently retrieving data is associated with network locations within a computer network. First, a list of mirrored network locations is determined. Communication performance is then monitored during communication with the list of network locations. If the communication performance of a network location is below predetermined levels, an alternate network location from the list is accessed. The list of network locations is accessed in sequence to locate a network location having acceptable communication performance. During the sequential access of network locations data is cascaded to produce efficient retrieval of data utilizing computer networks.

21 Claims, 7 Drawing Sheets

METHOD OF EFFICIENTLY RETRIEVING DATA ON A COMPUTER NETWORK BY MONITORING PERFORMANCE OF MIRRORED NETWORK LOCATIONS

BACKGROUND OF THE INVENTION

1. Technical Field

The present invention relates in general to a method for efficiently retrieving data from mirrored network locations by monitoring communication performance and in particular to a method and system for monitoring communication performance and selecting an acceptable communication link within a data processing system. Still more particularly, the present invention relates to a method and system for monitoring communication performance between a client and a computer network and cascading received data while searching for an acceptable communication link and network location.

2. Description of the Related Art

The development of computerized information resources, such as interconnection of remote computer networks, allows users of data-processing systems to link with other "servers" and networks, and thus retrieve vast amounts of electronic information heretofore unavailable in an electronic medium. A server provides interconnection along communicating networks. Such electronic information is increasingly displacing more conventional meant of information transmission, such as newspapers, magazines, and even television. Often, users desire quick access to specific information on a re-occurring basis. It is therefore desirable to maximize efficiency and minimize complexity when retrieving information from predetermined locations utilizing a computer.

In computer communications, a set of computer networks which are possibly dissimilar from one another are joined together by "gateways". Gateways provide data transfer and conversion of messages from the sending network to the protocols and data type utilized by the receiving network. A gateway is a device utilized to connect dissimilar networks, or networks utilizing different communication protocols, such that electronic information utilizing different standards can be processed and transmitted from network to network. Gateways convert information to a form compatible with the protocols utilized by other networks for transport and delivery.

One type of remote network commonly utilized in recent years is the Internet. The term "Internet" is an abbreviation for "Internetwork," and is commonly utilized to describe the collection of networks and gateways which are compatible with the TCP/IP suite of protocols. TCP/IP protocols are well-known in the art of computer networking. TCI/IP is an acronym for "Transmission Control Protocol/Internet Protocol," a software protocol developed by the Department of Defense for communication between computers. The Internet can be described as a system of geographically distributed remote computer networks interconnected by computers which provide an interface that allow users to interact and share information oven the networks. Because of such widespread information sharing, remote networks such as the Internet have this far generally evolved into an "extensive" system which developers can provide information or services essentially without restriction.

Electronic information transferred between data-processing networks is usually presented in "hypertext", a metaphor for presenting information in a manner in which text, images, sounds, and actions become linked together in a complex non-sequential "web" of associations. The web of associates permit a user to "browse" or "navigate" through related topics, regardless of the presented order of the topics.

These links are often established by both the author of a hype text document and by the user, depending on the intent of the hypertext document. For example, traveling among lines to the word "iron" in an article displayed within a graphical user interface, in a data-processing system, might lead the user to the periodic table of the chemical elements (i.e., linked by the word "iron"), or to a reference to the utilization of iron in weapons in Europe in the Dark Ages.

The term "hypertext" was coined in the 1960s to describe documents, as presented by a computer, that express tie nonlinear structure of ideas, as opposed to the lineal format of books, film, and speech. The term "hypermedia," on the other hand, more recently introduced, is nearly synonymous with "hypertext," but focuses on the non-textual components of hypertext, such as animation, recorded sound, and video.

A typical networked system which utilizes hypertext and hypermedia conventions follows a client/server architecture. The "client" is a member of a class or group that utilizes the services of another class or group to which it is not related. Thus, in computing, a client is a process (i.e., roughly a program or task) that requests a service provided by another program active in a "server". The client process utilizes the requested service without having to "know" any working details about the other program or the service itself. In a client/server architecture, particularly a networked system, a client is usually a computer that accesses shared network resources provided by a server (i.e., another computer).

A request for information by a user is sent by a client application program to a server. A server is typically a remote computer system accessible over a remote network, such as the Internet. The server scans and searches for raw (e.g., unprocessed) information sources, for example, newswire feeds or newsgroups. Based upon the user's request, the server presents filtered electronic information as a server response to the client process. The client process may be active in a first computer system, and the server process may be active in a second computer system. The client and server communicate with one another over a communications medium, thus providing distributed functionality and allowing multiple clients to take advantage of the information-gathering capabilities of a single server.

Free or relatively inexpensive computer software applications, such as Internet "search engines," allow a user to locate sites where an individual can obtain information on a topic of interest. A person utilizing a graphical user interface of a computer system may enter a subject or key word which generates a list of network locations or "web sites". "Home pages" or title pages for a network location are published by thousands of companies, universities, government agencies, museums, and municipalities. Thus, the Internet can be an invaluable information resource.

A client and server can communicate with one another utilizing the functionality provided by Hypertext-Transfer Protocol (HTTP). The World Wide Web (WWW) or, simply, the "web," includes those servers adhering to the HTTP standard, such servers are accessible to clients via a computer or data-processing system network address, such as a Universal Resource Locator (URL). A network location dan be directly accessed by utilizing a Universal Resource Locator address.

Active within the client is a first process, known as a "browser," which establishes the connection between the client and the server and presents information to the user on a graphical user interface. The server itself executes corresponding server software which presents information to the client in the form of HTTP responses. The HTTP Responses correspond to "web pages" constructed from a Hypertext Markup Language (HTML), or other server-generated data. A client and a server may be coupled to one another via a Serial Line Internet Protocol (SLIP) or a TCP/IP Connection for high-capacity communication.

Generally, a client displays a browser and data received from the network is displayed via a graphical user interface. A graphical user interface is a type of display format that enables a user to choose commands, start programs, and see lists of files and other options by pointing to pictorial representations (icons or selectable buttons) and/or lists of menu items on the display. User selections are generally activated either with a keyboard or a mouse.

A graphical user interface (GUI) can be employed by a user to start processes, view file content and to select tolls. Additionally, a GUI allows a user to command many selectable tools by pointing to a desired selection and depressing a push button typically utilizing a mouse. A desired selection might be a textual reference, a toolbar button, or a selection from a list of menu items on a computer display screen.

A user selectable choice can generally be activated by either a keyboard or a push button switch located on a pointing device such as a "moused". A mouse is a commonly utilized pointing device, generally containing more than one button. A pointing device allows a user to interact with a product or operating environment, such as a graphical user interface. In many graphical user interfaces, a vertical or horizontal bar at the side, bottom or top of a graphical user interface window can be utilized in conjunction with a pointing device, such as a mouse, trackball, or stylus to quickly select features of the application program.

Additional vertical and horizontal bars may contain "selectable buttons." Selectable buttons are commonly called "icons" by those familiar with graphical user interfaces. An icon is a selectable button viewable within a graphical user interface, typically containing a pictorial representation or a mnemonic representative of a selectable feature.

Generally, the pictorial representation contained within an icon is a graphic symbol allowing a user to associate an icon with a particular selectable function. An icon can be selected by pointing to the icon utilizing a pointing device and activating a push-button on the mouse when the icon is pointed to. Pointing to a selection add depressing a mouse button is commonly referred to by those having skill in the art as "pointing and clicking" on the icon or on the menu item. Pointing and clicking is a user friendly way to select a particular function or software application. Generally, an icon contains a visual mnemonic which allows a user to identify a selection without having to remember commands or type in commands utilizing a keyboard as is required in a disk operating system (DOS) environment.

Horizontal or vertical bars containing textual menu category hearings are commonly referred to as menu bars. Horizontal or vertical bars containing icons are commonly referred to as toolbars. Toolbars are a well known part of graphical user interfaces which simplifies access to files and allows the user to perform complicated system commands by pointing and clicking on a selectable item within the graphical user interface. Toolbar selectable user commands provide efficient interface between the user and a computer system. Often, user selectable commands located on a toolbar are duplicated in the menu bar.

It is easier and more efficient to activate selections within a toolbar than to locate and select menu headings and corresponding menu items. Menu items and sub-menu items are not continuously displayed and a menu heading must be selected to view a list of menu items contained under the menu heading.

It is often difficult to locate desirable information resources, or web pages, and locating a pertinent resource can consume a substantial amount of time. Locating an information resource is typically done by keyword searching. Keyword searching is accomplished when a user provides a keyword and instructs the client via a server to search for information resources having the keyword or information resources linked to the keyword. Typically, the user receives voluminous information from the internet when a keyword search is performed. A single retrieval can provide links to a considerable quantity of network locations. Next, the user must sort through the received information for desirable data.

Web pages or network locations can also be accessed by a client which specifies a unique network address (i.e., Universal Resource Locator). A Universal Resource Locator ha; two basic components, the protocol to be utilized aid the object pathname. For example, the Universal Resource Locator address, "http://www.uspto.gov" is the home page for the U.S. Patent and Trademark Office. This address specifies a hypertext-transfer protocol ("http") and a pathname of the server ("www.uspto.gov"). The server name is associated with a unique numeric value (TCP/IP address).

The graphical portion of the World Wide Web itself is usually stocked with more than twenty-two million "pages" of content, with over one million new pages added every month. With a little practice, a user can skim millions of web pages or thousands of newsgroups, not only for topics of general interest, but also to access desirable and meaningful data. However, locating and scanning web pages can consume hours and hours of a users time. The market for Internet access and related applications is explosive and utilization of the internet is growing faster than expected, doubling in size approximately every three months. Because of the growth of the "Internet" and the so-called "World Wide Web" in recent years, the amount of data which must be screened to get desirable data is overwhelming.

In order to avoid the inefficiencies of relocating a resource after it is has been initially located, a "bookmark", "hotlist" or "favorites" function is typically offered as part of the graphical user interface within a web browser application program. Generally, a bookmark or favorites is a universal resource locator or a network address which is stored by the browser. When a bookmark is selected, the corresponding URL address is sent to a server by the client, then the desired location is accessed and corresponding information is retrieved efficiently with minimal user input and effort.

A typical user retains a considerable quantity of bookmark locations. Typically, a user places bookmark network locations in folders. A folder is a grouping of network locations within a bookmark menu selection. Selecting the bookmark heading will display folder titles. Selection of the folder title will display the stored network locations. Generally, a folder will contain network locations having similar subject matter.

Often, a web page provides "links" or highlighted keywords which provide access to other network locations or web pages having related subject matter. Such network locations provide information on subject matter related to the highlighted keyword. Links provide efficient access to web pages having information related to the highlighted keyword or link. Typically, the link displayed provides a URL address which resides in hidden text within the displayed web page.

When a user points and clicks on a displayed link, a browser will retrieve the hidden URL address and then directly access the network location pertaining to the displayed link. Typically, the browser will utilize the URL found in the hidden text to locate the linked network location. Links within a web page provide quick access to identical or related subject matter. Selecting and retrieving a linked web page allows fast and efficient examination of the linked subject matter for relevance.

Data available from a network location is often duplicated or "mirrored" at other network locations. These duplicate locations are commonly referred to as "mirrored network locations". Often, if mirrored network locations exists, the mirrored network locations are displayed on an initial page retrieved from a network location. Typically, displayed text indicating mirrored network locations is highlighted to indicate that the mirrored network location is on screen selectable by a pointing device. Alternately described, links to mirrored network locations are often provided within data retrieved over a computer network. Typically, selecting the highlighted mirrored link consists of pointing to the highlighted link and clicking on the link also referred to as pointing and clicking on the link utilizing a pointing device such as a mouse. Pointing and clicking on the line immediately attempts establishment of a communication link with the selected mirrored network location.

Often, the rate at which data is being received from a network location is slow. Telephone switching systems and computers which provide data to the users can be overloaded by tremendous quantities of users. Overloading a computer network slows network data transmission to intolerable levels. For example, a slow communication link downloading a video image may take on the order Of ten minutes in a heavily loaded computer network. Currently, tremendous communication speed is attainable with modern communication hardware. Therefore, many individuals prefer maximum performance and minimal delay.

When communication performance becomes unacceptable or the communication rate or the "download rate" is unacceptably slow, a user will manually terminate the communication and manually select a mirrored network location, which, hopefully will provide superior communication performance. In this scenario, a new connection must be established and the download from the newly selected mirrored network location must be restarted. All previously received data is discarded.

Slow data transmission can be due to many different phenomena. For example, a poor hardwired connection or a slow switch from a telephone service provider can drastically hinder data transmission speed. Additionally, heavy usage of a network location significantly slows the rate at which the sever can process client requests and the rate at which the server can transmit data to a client or user.

Currently, management of communication performance of network locations and mirrored network locations must be performed manually. This makes effective management of mirrored network locations virtually impossible. A user must access a network location then manually monitor its performance then decide whether to terminate the communication link and re-establish another communication link with another network location.

Additionally, the user has no effective way to monitor data rates and the user can only guess a which communication link provides superior performance. However, a computer can efficiently determine communication performance and quickly terminate and access network locations. A user friendly interface to determine acceptable communication performance and consecutively access mirrored network locations would be very desirable.

Based on the foregoing it can be seen that a need exists for automated monitoring of communication performance by a data processing system and automated accessing of mirrored network locations base on communication performance. It would therefore be desirable do devise a method of minimal complexity which allows users to efficiently command a computer to locate a network location from a list of mirrored network locations which has superior communication performance. It would be further advantageous to devise a method to allow a user to manage communication performance by setting minimum communication performance standards. Additionally, it would be advantageous if the method would retain current user interface behavior, but extend user functionality and increase communication performance.

SUMMARY OF THE INVENTION

It is therefore one object of the present invention to provide a method for efficiently retrieving data from mirrored network locations by monitoring communication performance.

It is another object of the present invention to provide a method and system for monitoring communication performance and selecting an acceptable communication link within a data processing system.

It is yet another object of the present invention to provide a method and system for monitoring communication performance between a client and a computer network and cascading received data while searching for an acceptable communication link and network location.

The foregoing objects are achieved as is now described. An improved method for efficiently retrieving data is associated with network locations within a computer network is provided. First, a list of mirrored network locations is determined. Communication performance is then monitored during communication with the list of network locations. If the communication performance of a network location is below predetermined levels, an alternate network location from the list is accessed. The list of network locations is accessed in sequence to locate a network location having acceptable communication performance. During the sequential access of network locations data is cascaded to produce efficient retrieval of data utilizing computer networks.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
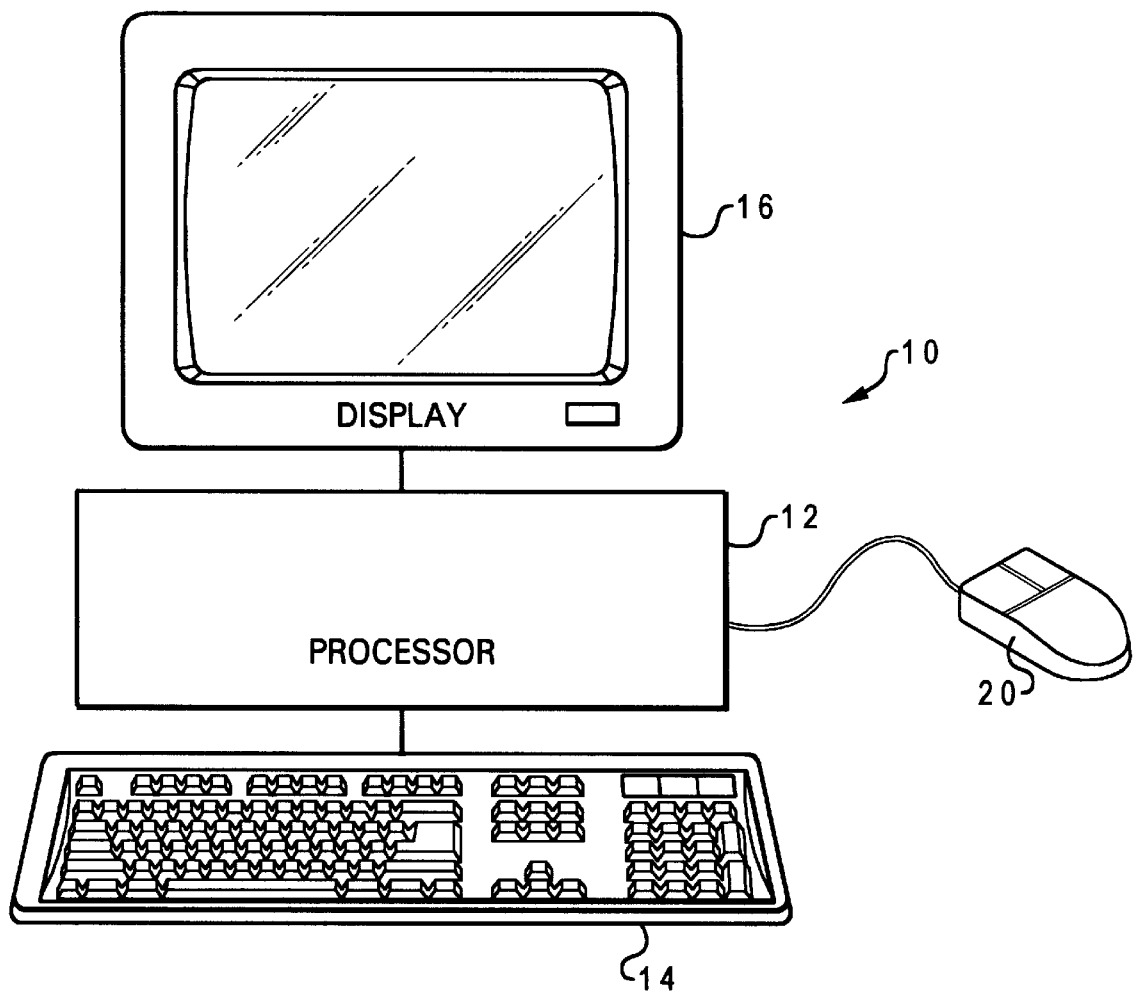
FIG. 1 is a pictorial representation of a data processing system which can be utilized to implement the method and system of the present invention.

With reference now to the figures and in particular with reference to FIG. 1, there is depicted a pictorial representation of a data-processing system in which a preferred embodiment of the present invention may be implemented, A computer 10 is depicted which includes a system unit 12, video display terminal 16, alphanumeric input device (i.e., keyboard 14) having alphanumeric and other keys, and mouse 20. An additional input device (not shown), such as a trackball or stylus, (not shown) also can be included with computer 10.

Computer 10 can be implemented utilizing any suitable computer, such as an IBM Aptiva™ computer, a product of International Business Machines Corporation, located in Armonk, N.Y. "Aptiva" is a registered trademark of International Business Machines Corporation.

Although the depicted embodiment involves a personal computer, a preferred embodiment of the present invention may be implemented in other types of data processing systems, such as intelligent workstations or minicomputers. Computer 10 also preferably includes a graphical user interface that resides within a machine-readable media to direct the operation and user interface of computer 10. Computer 10 also can be implemented utilizing any suitable computer, such as the IBM RISC/6000 computer, also a product of International Business Machines Corporation, located in Armonk, N.Y. "RISC SYSTEM/6000" is a trademark of International Business Machines Corporation, and also can be referred to as the "RS/6000."

Figure 2:
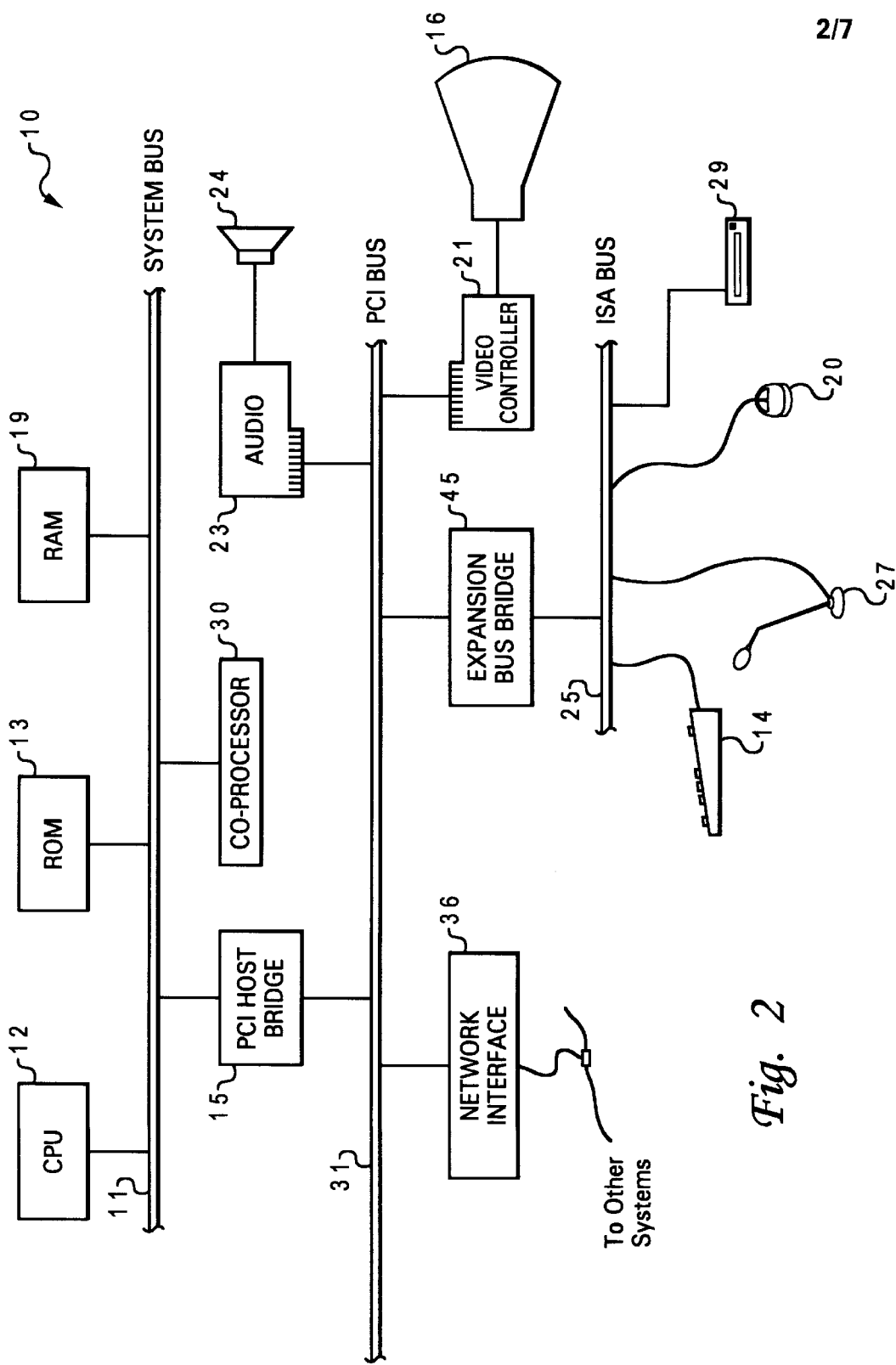
FIG. 2 depicts a block diagram illustrative of selected components of a data processing system or a personal computer system in accordance with the method and system of the present invention.

Referring now to FIG. 2, there is depicted a block diagram of selected components in accordance with computer 10 of FIG. 1. A preferred embodiment of the present invention may be implemented with the system architectures of FIG. 2. Computer 10 preferably includes a system bus 11. System bus 11 is utilized for interconnecting and establishing communication between various components within computer 10. Microprocessor or central processing unit (CPU) 12 is connected to system bus 11 and also may have numeric co-processor 30 connected to it. Read-only memory ("ROM") 13 and random-access memory ("RAM") 19 are also connected to system bus 11. ROM 13 is mapped into CPU 12 address space in the range from 640K to 1 megabyte. RAM 19 is attached to system bus 11 and contains system-configuration information. Any suitable machine-readable media may retain an application program, such as a graphical user interface, a browser within computer 10, such as RAM 19, ROM 13, a magnetic diskette, magnetic tape, or optical disk.

Also connected to system bus 11 is PCI host bridge 15 which couples system bus 11 to PCI bus 31. PCI host bridge 15 controls the flow of data between PCI bus 31 and various peripherals, adapters, and devices. Expansion bridge bus 45 controls the flow of data from PCI bus 31 to ISA bus 25. ISA bus 25 couples various I/O devices to computer 10. I/O devices include keyboard 14, mouse 20, disk drive 29 and microphone 27. Keyboard 14, mouse 20 and disk drive 29 typically have controllers (not shown) which are utilized to interface ISA bus 25. Video controller 21 provides a hardware interface for video display terminal 16. Audio controller 23 provides a hardware interface for speaker 24.

A network interface adapter 36 additionally can be connected to PCI bus 31 in order to link computer 10 to other data-processing system networks in a client/server architecture or to groups of computers and associated devices which are connected by communications facilities (not shown).

Figure 3:
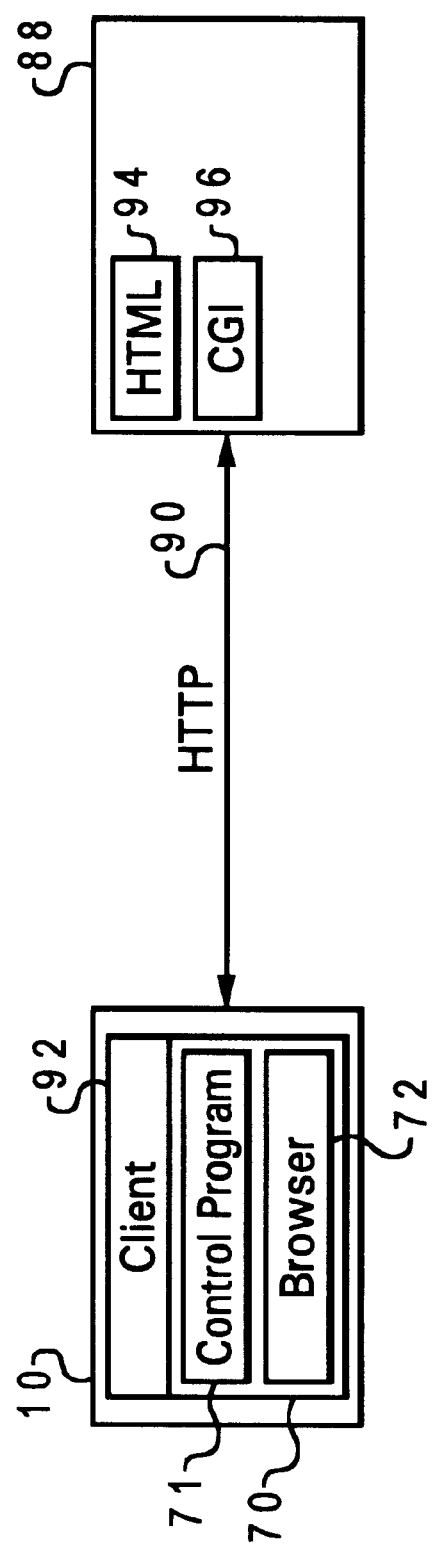
FIG. 3 is illustrative of a client server relationship which can be implemented in accordance with the method and system of the present invention.

FIG. 3 illustrates a block diagram illustrative of a client/server architecture which can be utilized in accordance with the method and system of the present invention. In FIG. 3, user requests for information are sent by client 92 via computer 10 in cooperation with an application program, such as browser 72 to server 88. Server 88 can be a remote computer system accessible over a communication line 90 or a remote network, such as the Internet. Server 88 performs scanning and searching of raw or unprocessed information sources, such as newswire feeds or newsgroups, and based upon these user requests, the server presents filtered electronic information as a server response over communication line 90 to the client process.

The client process may be active in a first computer system, and the server process may be active in a second computer system. The server process communicates with the first computer system over a communications medium, such as communication line 90 thus providing distributed functionality and allowing multiple clients to take advantage of the information gathering capabilities of a single server located miles away.

In a preferred embodiment, computer 10 and server 88 communicate utilizing the functionality provided by HTTP. Active within computer 10 is a first process, browser 72, which establishes the connections with server 88, and presents information to the user via a graphical user interface. Such browsers are often referred to in the art of computer networking as "web browsers." Any number of commercially or publicly available browsers may be utilized in accordance with a preferred embodiment of the present invention. For example, the Mosaic-brand browser available from the National Center for Supercomputing Applications (NCSA) in Urbana-Champaign, Ill., can be utilized with a preferred embodiment of the present invention. Other browsers, such as Netscape™, Netcruiser™, Explorer™ or the Lynx-brand browsers which provide the functionality specified under HTTP can also be utilized with a preferred embodiment of the present invention.

Server 88 executes the corresponding server software which presents information to client software in the form of HTTP responses. HTTP responses correspond with "web pages," which can be represented by utilizing Hypertext Markup Language (HTML), or other data generated by server 88. For example, under the Mosaic-brand browser, in addition to HTML functionality 94 provided by server 88, a Common Gateway Interlace (CGI) 96 is provided which allows the client program to direct server 88 to commence execution of a specified program contained within server 88. A client program may include a search engine which scans received information in server 88 for presentation to the user via client 92.

Utilizing a browser interface, and HTTP responses, server 88 may notify client 92 of the results of an execution upon completion. Common Gateway Interlace (CGI) 96 is one form of a "gateway," a device utilized to adapt data for utilization by dissimilar networks (i.e., networks utilizing different communication protocols), such that electronic information in different forms can be passed from one network to another. Gateways transfer electronic information, converting such information to a form compatible with the protocols utilized by a second network for transport and delivery.

Software application programs residing in main memory 70 are accessible by CPU 12 via system bus 11 of computer 10 described in FIG. 2. Applications in main memory include control program 71. Control program 71 contains instructions that when executed on a CPU carries out computations as a computer program product. The computer program product can also be referred to as a program product. Control program 71 can support a number of Internee-access tools including, for example, an HTTP-compliant web "browser." Known browser software applications include: Netscape Navigator® ("Netscape"), Mosaic™, Microsoft Explorer™, and the like. Netscape, in particular, provides the functionality specified under HTTP. "Netscape" is a trademark of Netscape, Inc. Mosaic-brand browser is available from the National Center for Super-computing Applications (NCSA) in Urbana-Champaign, Ill., and Explorer is available from Microsoft Corp. However, the present invention can be utilized with any web browser or any developing web browser Control program 71 can support other remote network services, such as a file-transfer protocol (FTP) service, which facilitates the transfer and sharing of files across remote networks, such as the Internet. Control program 71 can further support remote network services, such as remote terminal access (Telnet), which allows users to log onto computers coupled to the network. In addition, control program 71 can support services, such as simple mail-transfer protocol (SMTP), or e-mail, and network news-transfer protocol (NNTP) or "Usenet," all of these network services are well-known in the art of computer networking.

It is important to note that, while the present invention his been, and will continue to be described in the context of a fully functional computer system, those skilled in he art can appreciate that the present invention is capable of being distributed as a program product in a variety of forms and that the present invention applies equally regardless of the particular type of signal-bearing media utilized to actually carry out the distribution. Examples of signal-bearing media include recordable-type media, such as floppy disks, hard-disk drives, audio CDs and CD ROMs, and transmission-type media, such as digital and analog communication links.

Those skilled in the art will appreciate that the hardware depicted in FIGS. 1 and 2 may vary for specific applications. For example, other peripheral devices, such as optical-disk media, audio adapters, or chip-programming devices, such as PAL or EPROM programming devices and the like also may be utilized in addition to or in place of the hardware already depicted. Note that any or all of the above components and associated hardware may be utilized in various embodiments. However, it can be appreciated by those having skill in the art that any configuration of the aforementioned system and any future, yet to be developed, configuration may be utilized to implement the present invention.

Figure 4:
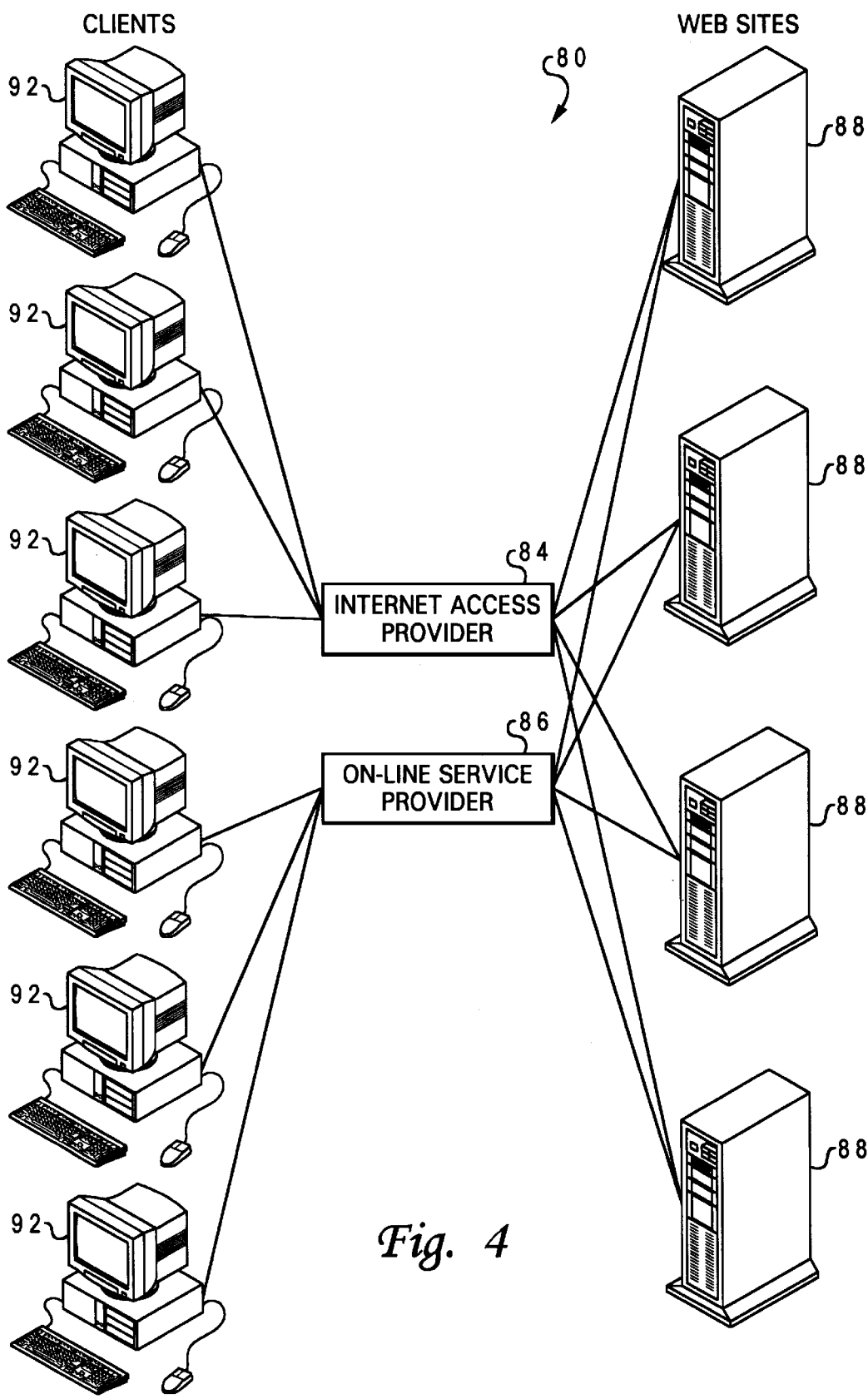
FIG. 4 depicts an internet configuration in which an implementation of a method and system can be accomplished in accordance with the present invention.

Referring to FIG. 4 an illustration of a computer network 80 is depicted which can be implemented in accordance with the method and system of the present invention. In FIGS. 3 and 4 like parts are identified utilizing like reference numerals. Computer network 80 is representative of a remote network, specifically the Internet, a known computer network based on the client-server model discussed earlier. Conceptually, the Internet includes a large network of servers 88 which are accessible by users of personal computers or clients 92 also. Personal computers typically access a server via a private Internet access provider 84 (e.g., such as Internet America™) or an on-line service provider 86 (e.g., such as America On-Line™, Prodigy™, Compuserve™, and the like). Each client 92 may run a browser, a known software toot utilized to access server 88 via Internet access provider 84. Server 88 operates a network location which supports files in the form of documents and pages. A network path to server 88 is identified by a Universal Resource Locator (URL) having a known syntax for defining a network collection. Again, FIGS. 3 and 4 are merely illustrative and it can be appreciated by those having skill in the art that any working configuration or future configuration can be utilized to implement the present invention. New communication configurations or interconnect configurations will not part from the scope of the present invention.

Figure 5:
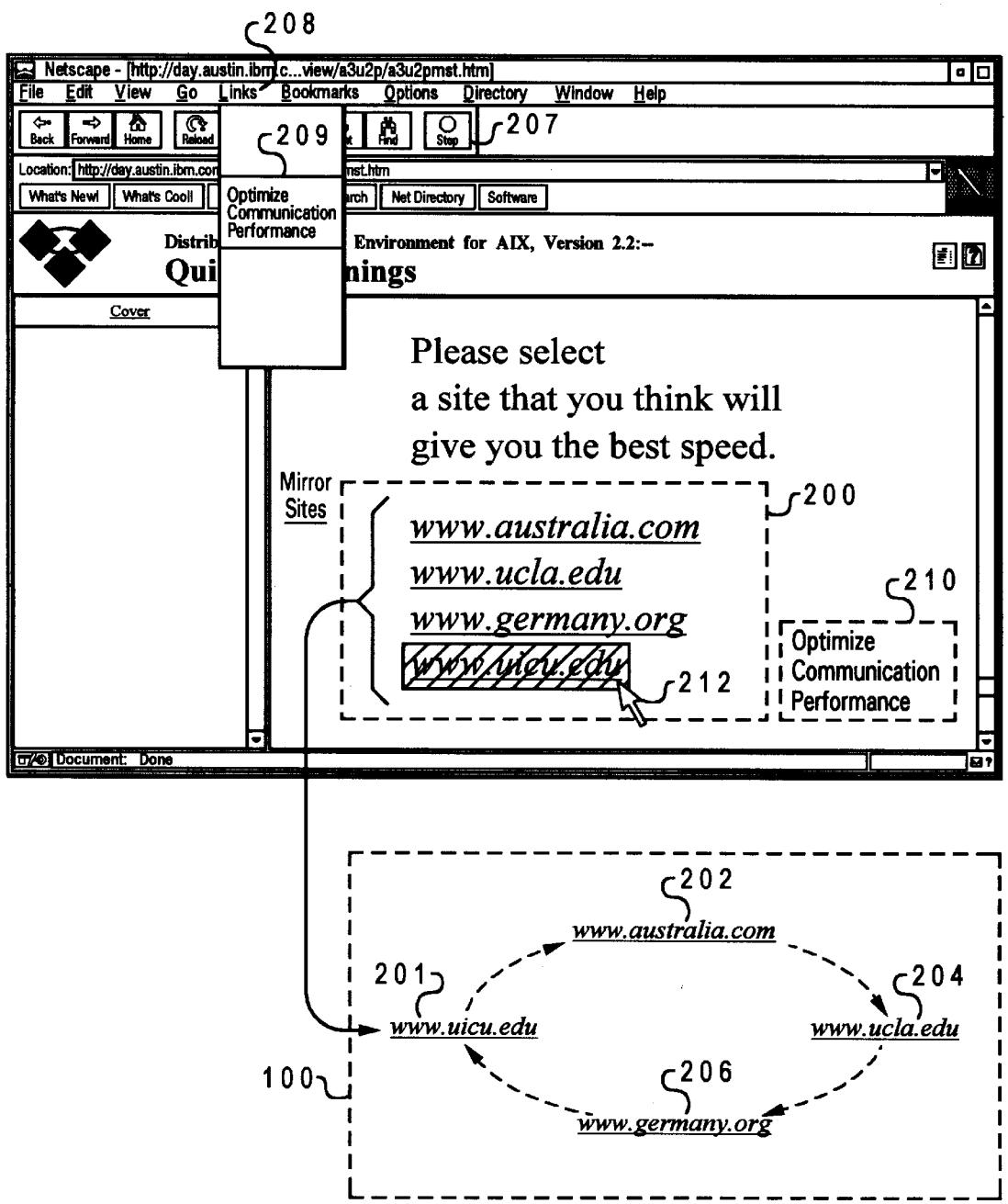
FIG. 5 illustrates a network location having mirrored network locations and how the mirrored location could be utilized in a circulating list in accordance with the present invention.

Referring to FIG. 5, a network location displaying links to mirrored network locations is illustrated. Four mirrored network locations are depicted in first dashed enclosure 200. The web page of FIG. 5 allows a user two options. First, a user can select one of the mirrored network locations to download the desired information. Second, the user can pick the circulating list download option entitled "optimize communication performance". The circulating list download option can utilize the list of mirrored network locations displayed in first dashed enclosure 200 to obtain the requested data. Selectable button 210 can receive a user request for this feature. Alternately, the selectable optimum performance option could be located under a menu heading. Selectable menu option optimize communication performance 209 is illustrated under menu heading "links" 208. Further, the selectable feature could be in the form of an "icon" such as icon 207.

It is preferred that the user is allowed to select a network location from a list of mirrored network locations in first dashed enclosure 200 which the user believes will provide the best communication performance. User selection of an initial network location can be performed by utilizing pointing device 212 to point to the desired selection and depressing a mouse button, this process is commonly referred to as "pointing and clicking" on the displayed network location.

If the optimize communication performance mode is selected and the initial network address selected by the user does not provide acceptable communication performance, the initial communication link is terminated and communication with a network location having identical data, or a mirrored location is established. The process of terminating and accessing network locations can continue until the desired information is retrieved.

In a preferred embodiment, the user is allowed to select an initial network address, based upon a users prior experience, believing a particular network location might be known to provide the best communication performance. Alternately, a computer or data processing system could select the initial network address based upon past performance or other parameters. Such parameters could also be determined when communication is established with a network address. For example, a server could communicate its present loading and corresponding data transfer capacity and the client could determine whether to select another network location.

Although it is preferred to prompt a user to determine whether the user desires optimum communication performance, this feature could be a default setting and the data processing system could automatically perform communication optimization for all computer network communication.

In response to a user's selection of optimum performance, the data processing system can automatically determine the network location which will provide the best performance by establishing a communication link with multiple network addresses. A circulating list approach for optimum download performance is illustrated in second dashed enclosure 100. Second dashed enclosure 100 illustrates the order of the "round-robin" search or a circulating list of mirrored network locations to be accessed to locate an acceptable communication link. In an alternate embodiment, the user could be allowed to rank the mirrored network locations in an order of perceived communication performance and the data processing system would utilize this order in generating the circulating list to be utilized in the optimization sequence. Further, known slow network locations may be deleted from the recirculating list or if left unranked by the user. It is preferred that unranked network locations would be bypassed and not utilized in determining an optimum communication link by the data processing system.

In the illustrated embodiment, the user has selected www.uicu.edu utilizing point device 212. The method starts by accessing the user selected network location or establishing a communication link with first network location 201 illustrated in first dashed enclosure 200. If first network location 201 cannot provide communication performance which is above a performance threshold selected by the user, the method will terminate communication with first network location 201 and establish communication with the next network location within the circulating list, second network location 202. If second network location 202 has unacceptable communication link, the method then terminates communication with second network location 202 and accesses third network location 204.

Next, if third network location 204 does not provide adequate performance, the method terminates communication with third network location 204 and establishes communication with 4th network location 206. If 4th network location 206 is unacceptable, the method iterates to another network location possibly the original selected network location, or first network location 201. After each network address in the circulating list has been utilized, the method could return to the network location determined to provide the best communication performance or revisit any network location in the circulating list.

If a communication link consistently provides poor performance, the network location related to the poor communication link can be deleted from the circulating list. This will further improve the efficiency of the method of the present invention.

It is preferred that when communication with a network location is terminated, the data received from the terminated network location is stored and quantified. In a preferred embodiment, when a new network location is accessed, communication resumes at the location in the transmitted data where the previous network location terminated. This can be accomplished by many software features such as software pointers which are well known by those having skill in the art. Cascading received data allows the total download time to be enhanced when many network locations are accessed. The server skips to the location in the data where the previous network location connection was terminated, and start the data transfer in response to the software pointer, thereby, bypassing considerable quantities of data and reducing the quantity of data to be transmitted.

Figure 6:
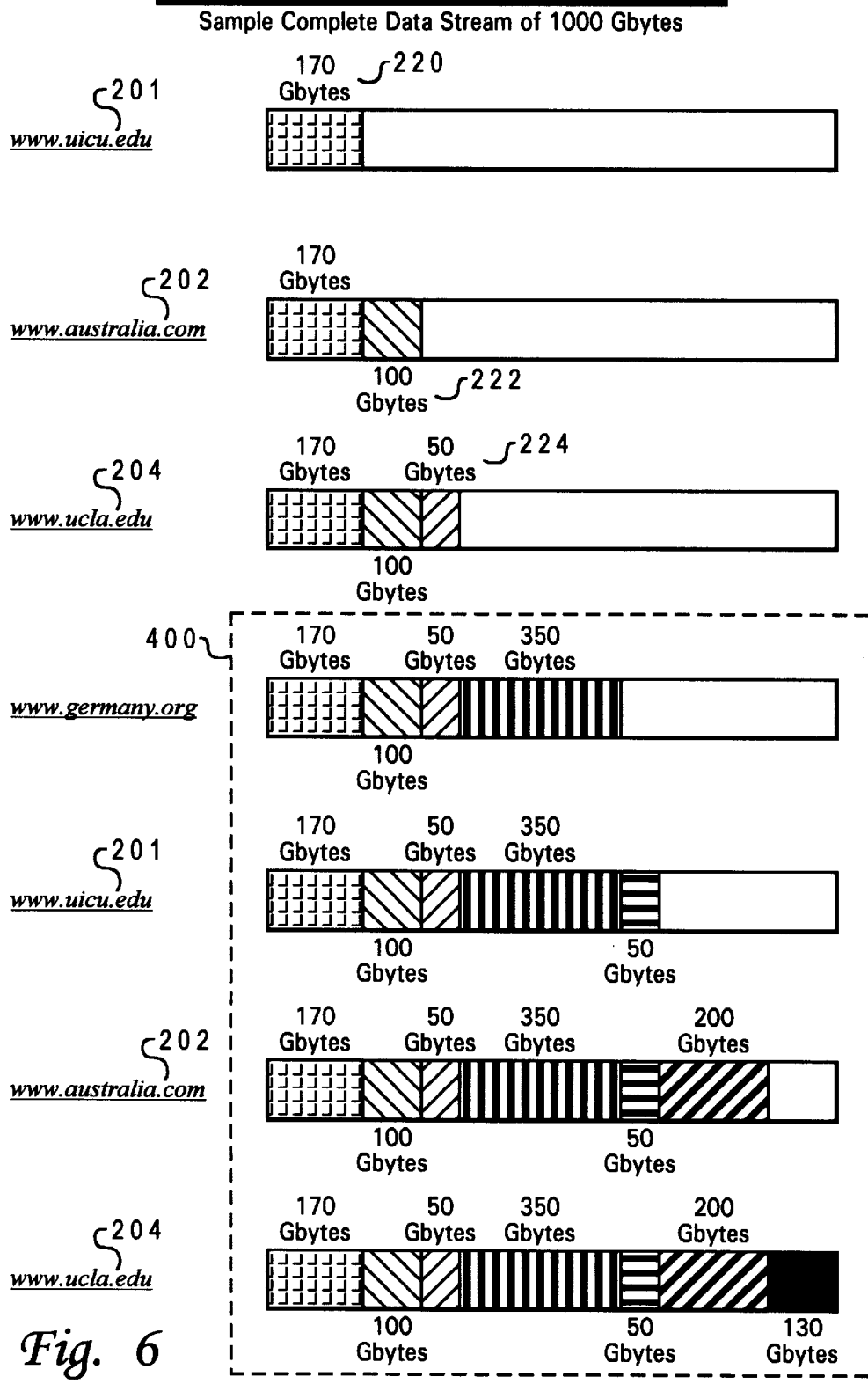
FIG. 6 depicts how a 1000 gigabytes could be downloaded by cascading received data in accordance with the present invention.

Referring now to FIG. 6, the reception of one thousand gigabytes from mirrored network locations utilizing a circulating list is depicted. In FIGS. 5 and 6 similar features have identical reference numerals. In FIG. 6 initially 170 gigabytes 220 are received from first network location 201. In the example illustrated, after reception of 170 gigabytes 220 the method has determined that the communication performance was unacceptable. Communication with first network location 201 was terminated and a communication link with second network location 202 was established. During reception of the next 100 gigabytes 222 from second network location 202, the method determined that second network location 202 was not providing acceptable communication performance and then 50 bytes 224 were received from third network location 204. As illustrated, when accessing a mirrored network location the present method does not require down loading from the beginning of the data package. Data received from successive network locations can be tacked on to data received from previous accessed network locations thereby cascading received data. Cascading retrieved data eliminates the re-transmission of identical data and allows more efficient performance of a client. Third dashed enclosure 400 is an exemplary illustration of completion of transmission from the list of mirrored network locations.

Figure 7:
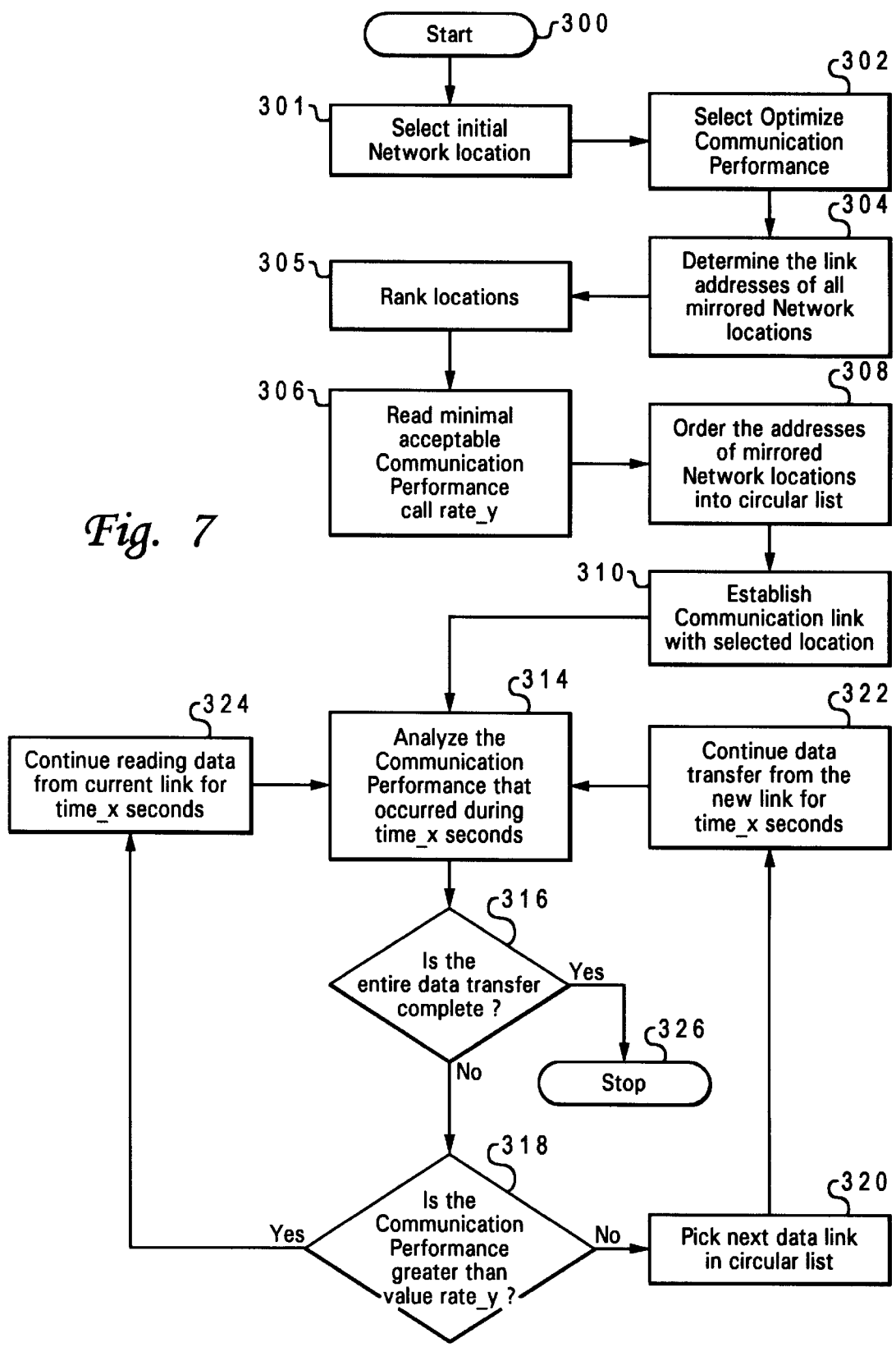
FIG. 7 illustrates a high level flow diagram of a present method to download data from a computer network in accordance with the present invention.

Referring now to FIG. 7, a high level flow diagram in accordance with the present invention is depicted. The method starts at block 300 and thereafter proceeds to block 301. In block 301, the user can select an initial network location to start network access. Next as illustrate in block 302 a user selection to optimize communication performance can be received. The method then proceeds to block 304 where addresses for mirrored network locations are determined. Next, as in block 305 the user can rank network locations in the order or perceived performance. Next, as depicted in block 306 the method determines a minimal acceptable rate for communication performance either as a default value or receives a communication performance value input by the user.

As depicted in block 308 mirrored network locations are loaded into a circular list according to their ranking. The ranking can be determined by a user as illustrated in block 305 or a data processing system can determine the order before or during the initiation of communication. As illustrated in block 310, the method established a communication link or starts data transfer from the first network location of the circulating list. As depicted in block 314, for a predetermined amount of time communication performance is monitored. Next, as illustrated in block 316 the method queries to see if the data transfer is complete.

If the data transfer is not complete, the method inquires into whether the communication performance is adequate as depicted in block 318. If communication performance is not adequate, the method iterates to block 320 and the next ranked network location from the circulating list is accessed. Then, as illustrated in block 322 data transfer is continued from the new network location for a predetermined amount of time. The communication performance is again analyzed. If the data transfer is not complete as illustrated in block 316, communication performance is again compared to a predetermined value as depicted in block 318.

If the communication performance rate is acceptable then the method proceeds to block 324 and the method continues accepting data from the current network location for a predetermined amount of time.

Next, the method iterates to block 314 and the communication performance is again monitored. If, as depicted in block 316 the entire data transfer is complete, the method is terminated at block 326.

The method can process through the loop from block 314 to block 324 multiple times in a single download. It is preferred that the monitoring function of the present invention does not perform at such a speed as to significantly slow the data retrieval process.

If a network location is determined to consistently provide superior communication performance, the amount of time utilized by the method of the present invention between performance checks could be increased.

While the invention has been particularly shown and described with reference to a preferred embodiment, it will be understood by those skilled in the art that various changes in form and detail may be made therein without departing from the spirit and scope of the invention.

What is claimed is:

1. A method for efficiently retrieving data comprising the steps of:
   establishing a communication link with a first network location;
   receiving data from said first network location, said data residing in a plurality of network locations;
   concurrently determining performance of said communication link;
   in response to a determination that said performance falls below a predetermined level, establishing a communication link with an alternate network location among said plurality of network locations; and
   ending data reception from said first network location and commencing data reception from said alternate network location, wherein data reception from said alternate network location commences at a point within said data at which data reception from said first network location ends.

2. The method of claim 1, further including the steps of:
   creating a list of said network locations; and
   ranking said network locations according to communication performance.

3. The method of claim 2, wherein said step of establishing accesses a highest ranked network location among said network locations.

4. The method of claim 2, further comprising the step of:
   removing poor performing network locations from said list of network locations; and
   periodically updating said list with good performing network locations not presently on said list.

5. The method of claim 1, further including the step of bypassing unranked network locations.

6. The method of claim 1, further including the step of monitoring past communication performance and accessing network locations responsive to said monitoring step.

7. The method of claim 6, further including the step of selecting said network locations based upon said step of monitoring of past communication performance.

8. The method of claim 1, wherein the step of monitoring is performed for a predetermined amount of time, which may be extended in response to said monitored communication performance.

9. The method of claim 8, further including the steps of:
   receiving a portion of said data up to said point at which said terminating step occurs;
   quantifying said portion of data received to enable location of said point within said data; and
   resuming data reception utilizing at said point within said alternate network location.

10. The method of claim 1, wherein said plurality of network locations provide said communication performance data, said determining step including the step of receiving said communication performance data from each of said plurality of network locations accessed.

11. The method of claim 1, wherein said plurality of network locations are mirrored network locations.

12. A computer program product for efficiently retrieving data associated with mirrored network locations within a computer network said program product comprising:
   a storage media;
   instruction means within said storage media for establishing a communication link with a network location;
   instruction means within said storage media for receiving data from a first network location, said data residing in a plurality of network locations;
   instruction means within said storage media for concurrently determining a performance of said communication link;
   instruction means within said storage media for, in response to a determination that said communication performance falls below a predetermined level, establishing a next communication link with an alternate network location among said plurality of network locations; and
   instruction means within said storage media for ending data reception from said first network location and commencing data reception from said alternate address location, wherein data reception from said alternate network location commences at a point within said data at which data reception from said first network location ends.

13. The program product of claim 12, further comprising instruction means within said storage media for:
   creating a list of said plurality of network locations; and
   ranking said plurality of network locations according to communication performance.

14. The program product of claim 13, further comprising instruction means within said storage media for accessing a network location corresponding to a highest ranked network location among said plurality of network locations.

15. The computer program product of claim 13, further comprising instruction means for providing a graphical user interface with selectable items for selecting said first network location and said mirrored network locations.

16. The program product of claim 12, further comprising instruction means within said storage media for bypassing unranked network locations.

17. The program product of claim 12, further comprising instruction means within said storage media for monitoring past communication performance and accessing network locations responsive to said monitoring means.

18. The program product of claim 17, further comprising instruction means within said storage media for selecting a network location based upon said means for monitoring of past communication performance.

19. A data processing system comprising:
a processor and a memory; and
a computer program product for retrieving data from a network location, said program product comprising:
a storage medium connected to said processor; and
instruction means within said storage medium for:
establishing a communication link with a first network location;
receiving data from the first network location, said data residing in a plurality of network locations;
concurrently determining a performance of said communication link;
in response to a determination that said performance falls below a predetermined level, establishing a communication link with an alternate network location among said plurality of network locations; and
ending data reception from said first network location and commencing data reception from said alternate address location, wherein data reception from said alternate network location commences at a point within said data at which data reception from said first network location ends.

20. The data processing system of claim 19, said program product further comprising instruction means for:
creating a list of said plurality of network locations;
ranking said plurality of network locations according to communication performance; and
accessing a network location corresponding to a highest ranked network location among said plurality of network locations.

21. The data processing system of claim 19, said program product further comprising instruction means for:
monitoring past communication performance and accessing network locations responsive to said monitoring means; and
selecting a network location based upon said monitoring of past communication performance.

\* \* \* \* \*

UNITED STATES PATENT AND TRADEMARK OFFICE
CERTIFICATE OF CORRECTION

PATENT NO. : 6,178,460 B1
DATED : January 23, 2001
INVENTOR(S) : Maddalozzo, Jr. et al.

It is certified that error appears in the above-identified patent and that said Letters Patent is hereby corrected as shown below:

Column 1,
Line 61, please delete "have this far" and insert instead -- have thus far --.

Column 2,
Line 5, please delete "hype text document" and insert instead -- hypertext document --;
Line 13, please delete "express tie" and insert instead -- express the --;
Line 14, please delete "lineal format and insert instead -- linear format --.

Column 3,
Line 26, please delete "such as a "moused"." and insert instead -- such as a "mouse." --;
Line 58, please delete "hearings" and insert instead -- headings --.

Column 5
Line 27, please delete "on the line" and insert instead -- on the link --.

Column 9,
Line 50, please delete "in he art" and insert instead -- in the art --.

Signed and Sealed this

Twenty-fifth Day of November, 2003

JAMES E. ROGAN
*Director of the United States Patent and Trademark Office*